United States Patent [19]

Peterson

[11] Patent Number: 5,753,980
[45] Date of Patent: May 19, 1998

[54] AUTOMATIC PREVENTION OF INADVERTENT OPERATION OF ELECTRONIC DEVICES

[75] Inventor: Eric Carl Peterson, Baldwinsville, N.Y.

[73] Assignee: Thomson Consumer Electronics, Inc., Indianapolis, Ind.

[21] Appl. No.: 634,894

[22] Filed: Apr. 25, 1996

[51] Int. Cl.$^6$ ............................................. H02J 3/06
[52] U.S. Cl. ........................ 307/39; 307/36; 307/37; 307/38; 307/139; 200/51 R; 200/51.09; 200/51.11; 200/51.13; 200/51.16; 439/188; 439/296; 439/603
[58] Field of Search ......................... 307/39, 11, 125, 307/114, 116, 36, 37, 139, 119, 112, 140, 38; 200/51 R, 51.09, 51.11, 51.13, 51.16; 439/188, 296, 603

[56] References Cited

U.S. PATENT DOCUMENTS

| | | | |
|---|---|---|---|
| 4,419,589 | 12/1983 | Ross | 307/39 |
| 4,575,640 | 3/1986 | Martin | 307/23 |
| 4,633,048 | 12/1986 | Komatsu | 439/188 |
| 4,861,284 | 8/1989 | Pauza | 439/603 |
| 4,915,639 | 4/1990 | Cohn et al. | 439/188 |
| 5,281,859 | 1/1994 | Crane | 307/139 |
| 5,436,511 | 7/1995 | Nigawara et al. | 307/39 |
| 5,513,999 | 5/1996 | Fry et al. | 200/51.09 |
| 5,565,714 | 10/1996 | Cunningham | 307/112 |

FOREIGN PATENT DOCUMENTS

| | | | |
|---|---|---|---|
| 0343571 | 11/1989 | European Pat. Off. | H04N 1/16 |
| 0360979 | 4/1990 | European Pat. Off. | H04N 1/16 |

*Primary Examiner*—William M. Shoop, Jr.
*Assistant Examiner*—Albert W. Paladini
*Attorney, Agent, or Firm*—Joseph S. Tripoli; Peter M. Emanuel; Robert D. Shedd

[57] ABSTRACT

Portable electronic equipment is disclosed which includes a source of power and operational circuitry. A load device, which may be internal or external to the equipment, is coupleable to the operational circuitry. A switch is coupled between the power source and the operational circuitry and connects the power source to the operating circuitry only when the load device is coupled to the operational circuitry. In portable audio equipment, for example, the switch connects the power source to the operational circuitry only if an external or the internal speaker is coupled to the operational circuitry.

10 Claims, 1 Drawing Sheet

AUTOMATIC PREVENTION OF INADVERTENT OPERATION OF ELECTRONIC DEVICES

FIELD OF THE INVENTION

The present invention generally concerns portable electronic devices, and specifically concerns apparatus for preventing operation of that device under certain conditions.

BACKGROUND OF THE INVENTION

Portable electronic equipment of various types currently require the attachment of external devices to operate properly. For example, portable equipment such as cassette tape players, CD players, or radio receivers are set up by attaching a set of external speakers, or by attaching earphones to the equipment and placing the earphones in the user's ear. When the equipment is operated, the sound is reproduced in the speakers or earphones and the user may listen.

Some portable electronic equipment further includes internal devices which may be used in place of the external devices normally used. For example, portable cassette tape players, CD players or radio receivers may include an internal speaker. Because of size, weight and power requirements, such a speaker may reproduce sounds with perceptible lower quality than the external speakers or earphones normally used. For this reason, such equipment includes a switch used to disable the internal speaker.

Because of its portable nature, such equipment may be stored in handbags or briefcases. The on/off switches in such equipment may come in contact with other items in such recepticles and may inadvertently be turned on. If the earphones or speakers are not attached and the internal speaker, if present, is disabled, the user cannot know that the equipment is on.

When such equipment is inadvertently left on, the batteries may be completely discharged, unbeknownst to the user, who only discovers this when the equipment is used next.

SUMMARY OF THE INVENTION

The subject invention recognizes that portable electronic equipment which is designed to prevent such inadvertent operation is desirable. In accordance with principles of the present invention, portable electronic equipment includes a source of power and operational circuitry. A load device is coupleable to the operational circuitry. A switch is coupled between the power source and the operational circuitry and connects the power source to the operational circuitry only when the load device is coupled to the operational circuitry.

In accordance with another aspect of the present invention, such a load device may be external or internal to the electronic equipment. In such equipment, a switch, coupled between the power source and the operational circuitry, connects the power source to the operational circuitry only when either the external device and/or the internal device is coupled to the operational circuitry.

Such electronic equipment operates only when the necessary external equipment is properly attached to it. Continuing the example above, the portable cassette tape player, CD player, or radio receiver is only powered-on when the earphones or external speakers are plugged in. If there is an internal speaker, then the equipment is powered-on if either the external speaker or earphones is plugged in, or the internal speaker is enabled. In this way, the user may be assured that, so long as the external device (speaker or earphone) is detached, the equipment will not inadvertently turn on. In the event that an internal speaker is enabled, and if the equipment is inadvertently turned on, then the speaker will make noise, and the user will know that the equipment has turned on, and can turn it off before the battery is worn down.

BRIEF DESCRIPTION OF THE DRAWING

In the drawing:

In FIG. 1, a source of power, e.g. a battery, 10 is coupled to the operational circuitry of a portable cassette tape player 30 through an on/off switch 20. The tape player operational circuitry 30 includes a tape transport device, tape head, amplifiers, and other signal processing circuitry arranged in a known manner (none of which is shown), and produces an audio signal at an output terminal. The audio signal at the output terminal of the tape player operational circuitry 30 is supplied to an internal speaker 50 through a speaker enable switch 40. The audio signal is also supplied to a recepticle 60 for a plug 71 (illustrated as a diamond shaped arrow) of an external device such as earphones 70 or an external speaker (not shown). An indication of the position of the speaker enable switch 40 is supplied to the on/off switch 20, as indicated in phantom in FIG. 1. In addition, an indication of whether an external device is present, as indicated in FIG. 1 by whether the plug 71 of earphones 70 has been inserted into the recepticle 60, is also supplied to the on/off switch 20, as indicated in phantom in FIG. 1.

Figure 1:
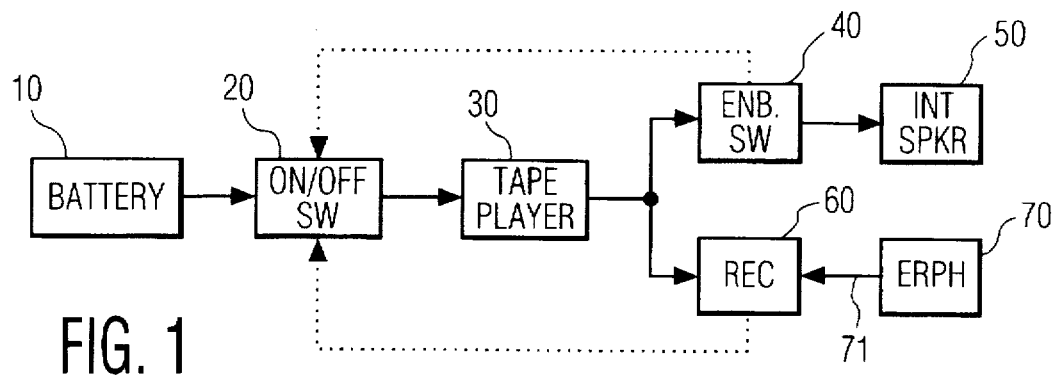
FIG. 1 is a block diagram of a portable cassette tape player incorporating the present invention.

In operation, the on/off switch 20 includes a mechanical switch which may be operated by the user to turn the cassette tape player on or off. Depending upon the position of the internal speaker enable switch 40, and the presence of the plug 71 from earphones 70 in the receptacle 60, in a manner to be described below, power from the battery 10 is supplied to the tape player operational circuitry 30 when the user closes the mechanical switch in the on/off switch 20. The tape player operational circuitry 30 operates in a known manner to drive the reels of the tape cassette, retrieve the previously recorded audio information from the tape, and generate an audio signal corresponding to that audio information. If the internal speaker enable switch 40 is closed, then the audio signal is supplied to the internal speaker 50, which reproduces the sound previously recorded on the tape, in a known manner. If the internal speaker enable switch 40 is open, then the audio signal is not supplied to the internal speaker 50, which remains silent. If external earphones 70 are plugged into the receptacle 60, then the audio signal is supplied to the earphones 70. The user may place the earphones 70 in his ears, and listen to the sounds previously recorded on the tape, all in a known manner.

If the internal speaker 50 is not enabled by the speaker enable switch 40 and the earphones 70 are not plugged into the recepticle 60, then there is no way to reproduce the sound previously recorded on the tape. If the cassette tape player is in this condition, it is assumed that it is not meant by the user to be operated. If the mechanical switch in the on/off switch 20 is turned on when the tape player is in this condition, no power is supplied to the tape player operational circuitry 30. This prevents the battery 10 from being discharged by running the cassette player in a condition where the sound may not be reproduced.

Figure 2:
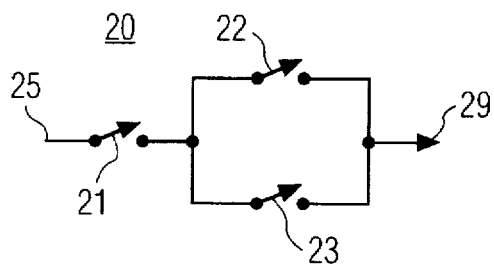
FIG. 2 is a schematic diagram of an arrangement for the on/off switch 20 of FIG. 1.

FIG. 2 is a schematic diagram of an arrangement for the on/off switch 20 of FIG. 1. In FIG. 2 an input terminal 25 is coupled to the battery 10 (of FIG. 1). Input terminal 25 is coupled to a first terminal of a mechanical switch 21. A second terminal of the mechanical switch 21 is coupled in common to respective first terminals of switches 22 and 23. Respective second terminals of switches 22 and 23 are coupled in common to an output terminal 29. Output terminal 29 is coupled to the tape player operational circuitry 30.

In operation, switch 21 is controlled by the user. When the user desires to turn on the tape player operational circuitry 30, the user closes the switch 21, and when the user desires to turn off the tape player operational circuitry 30, the user opens the switch 21. Switch 22 operates in tandem with the speaker enable switch 40 (in a manner to be described below). That is, when the speaker enable switch 40 is closed (enabling the internal speaker 50), the switch 22 is closed, and when the speaker enable switch 40 is open (disabling the internal speaker) the switch 22 is open. In a manner to be described below, the switch 23 is closed when the plug from an external earphone 70 or speaker is inserted into the receptacle 60, and is open when no such plug is inserted in the receptacle 60. In this manner, battery power is supplied to the tape player operational circuitry 30 only if the user-operated mechanical switch 21 is closed and either the internal speaker 50 is enabled, or the plug of an external earphone 70 or speaker is inserted into the receptacle 60.

Figure 3:
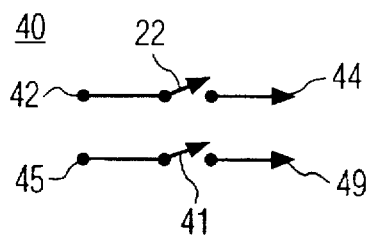
FIG. 3 is a schematic diagram of an arrangement for the speaker enable switch of FIG. 1.

FIG. 3 is a schematic diagram of an arrangement for the speaker enable switch 40 of FIG. 1. Speaker enable switch 40 is a known double-pole single-throw switch 40. A first pole 41 is coupled between an input terminal 45, coupled to the output terminal of the tape player operational circuitry 30, and an output terminal 49, coupled to the internal speaker 50. A second pole, forming switch 22 (of FIG. 2), is coupled between an input terminal 42, coupled to the mechanical switch 21, and an output terminal 44, coupled to supply power to the tape player operational circuitry 30.

The two poles, 41 and 22, of the double-pole single-throw switch (of FIG. 3) operate simultaneously, in a known manner, as illustrated by the dotted line between them. That is, when the user closes the switch 41 to enable the internal speaker 50, the switch 22 is simultaneously closed, and when the user opens switch 41 to disable the internal speaker 50, the switch 22 is simultaneously opened.

Figure 4:
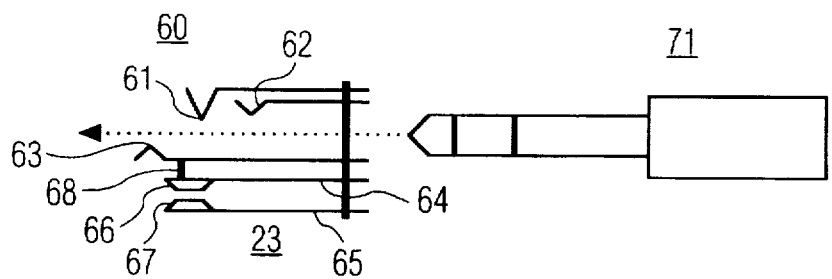
FIGS. 4 and 5 are mechanical diagrams illustrating arrangements for the earphone jack recepticle of FIG. 1.
Figure 5:
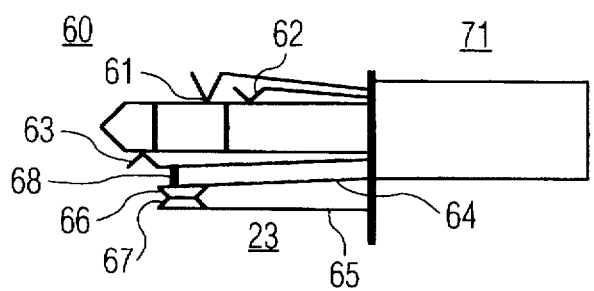

FIGS. 4 and 5 and are mechanical diagrams illustrating arrangements for the receptacle 60 of FIG. 1. FIGS. 4 and 5 illustrate, in a standard manner, the arrangement of a known jack 60 suitable for receiving a known so-called stereo plug 71. FIG. 4 illustrates such a jack 60 in an unplugged state, and FIG. 5 illustrates that same jack 60 into which a plug 71 has been inserted. In FIGS. 4 and 5 and contacts 61, 62 and 63 cooperate in a known manner with the stereo jack 71 to couple a left audio signal, a right audio signal and a common ground lead to the external earphone or speakers. The combination of contacts 64 and 65 form the switch 23 (of FIG. 2). A pair of contact pads, 66 and 67, are placed on the end of the contacts 64 and 65, respectively. An insulating spacer 68 is attached between contacts 63 and 64. In FIG. 4, in which the plug 71 is not inserted into the jack 60, it is seen that the contact pads 66 and 67 are spaced apart, and switch 23 is open. In FIG. 5, in which the plug 71 is inserted into the jack 60, it is seen that the plug 71 causes the contact 63 to bend away from the plug 71. The insulating spacer 68 causes the contact 66 to connect with contact 67, and switch 23 is closed.

The embodiment described above, and illustrated in FIG. 1 through FIG. 5, is but one possible embodiment of portable electronic equipment according to the present invention. One skilled in the art will understand that other embodiments are possible. For example, it is possible to detect the presence of the external device by it's electrical characteristics (e.g. impedance). Also other circuit arrangements for switching the power source to the operational circuitry under the proper conditions may readily embody the present invention. In addition, the switches in the above embodiment have been described and illustrated as mechanical switches. It is also possible that electronic switches, such as capacitive touch plate switches, and/or FET switches may be used to embody the present invention. Also, the switches illustrated in the embodiment described above are hardwired in their configuration. It is possible for logic circuitry to be fabricated and perform the power switching according to the present invention.

What is claimed is:

1. Portable electronic equipment connectable to a source of power, comprising:

operational circuitry;

an external device, coupleable to the operational circuitry; and a switch activated directly by coupling of the external device to the operational circuitry for switching between a first open position of the switch and a second closed position of the switch; the first open position of the switch decoupling the operational circuitry from the power source and the second closed position of the switch coupling the operational circuitry to the power source.

2. The equipment of claim 1 further comprising:

a detector for detecting when the external device is coupled to the operational circuitry; and wherein the switch comprises a series connected pair of a user operated switch, and a second switch responsive to the detector, for closing when the detector has detected that the external device is coupled to the operational circuitry, and opening otherwise.

3. The equipment of claim 2 wherein:

the external device comprises a plug for coupling to the operational circuitry; and the detector comprises a jack positioned to cooperate with the second switch, wherein the second switch is closed when the plug is inserted into the jack and open when the plug is not inserted into the jack.

4. Portable electronic equipment, comprising:

a source of power;

operational circuitry;

an external device, coupleable to the operational circuitry;

an internal device, selectively coupled to the operational circuitry;

a switch, coupled between the power source and the operational circuitry, for connecting the power source to the operational circuitry only when at least one of the external device and the internal device is coupled to the operational circuitry; and a double pole single throw switch having a first pole coupled between the power source and the operational circuitry and a second pole coupled between the operational circuitry and the internal device; and wherein:

the switch comprises a series connection of a user operated switch and the first pole of the double pole single throw switch.

5. Portable electronic equipment, comprising:

a source of power;

operational circuitry;

an external device, coupleable to the operational circuitry;

an internal device, selectively coupled to the operational circuitry;

a switch, coupled between the power source and the operational circuitry, for connecting the power source to the operational circuitry only when at least one of the external device and the internal device is coupled to the operational circuitry; and a detector for detecting when the external device is coupled to the operational circuitry; and wherein:

the switch comprises a series connection of a user operated switch and a second switch, responsive to the detector, for closing when the detector has detected that the external device is coupled to the operational circuitry, and opening otherwise.

6. The equipment of claim 6 wherein:

the external device comprises a plug for coupling to the operational circuitry; and the detector comprises a jack positioned to cooperate with the second switch, wherein the second switch is closed when the plug is inserted into the jack and open when the plug is not inserted into the jack.

7. The equipment of claim 5 further comprising a third switch, coupled in parallel with the second switch, for closing when the internal device is couple to the operational circuitry and opening otherwise.

8. The equipment of claim 7 wherein the third switch comprises a double pole single throw switch having a first pole coupled between the power source and the operational circuitry and the internal device.

9. The equipment of claim 1 wherein the external device is an external speaker.

10. The equipment of claim 1 wherein the external device is an internal speaker.

* * * * *

UNITED STATES PATENT AND TRADEMARK OFFICE
CERTIFICATE OF CORRECTION

PATENT NO. : 5,753,980

DATED : May 19, 1998

INVENTOR(S) : Eric Carl Peterson

It is certified that error appears in the above-identified patent and that said Letters Patent is hereby corrected as shown below:

Column 6, line 15, after "operational" and before "circuitry" insert --circuitry and a second pole coupled between the operational--

Signed and Sealed this

Eighteenth Day of August, 1998

Attest:

Attesting Officer

BRUCE LEHMAN

Commissioner of Patents and Trademarks